US011380097B2

(12) United States Patent
Bai et al.

(10) Patent No.: US 11,380,097 B2
(45) Date of Patent: Jul. 5, 2022

(54) VISUALIZATION OF NON-VISIBLE PHENOMENA

(71) Applicant: Apple Inc., Cupertino, CA (US)

(72) Inventors: Ying Bai, San Jose, CA (US); Kieran Dimond, San Jose, CA (US); James Christopher Schneider, Castro Valley, CA (US); Marco Cavallo, Santa Clara, CA (US); Arun Srivatsan Rangaprasad, Sunnyvale, CA (US); Tiejian Zhang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/378,635

(22) Filed: Jul. 16, 2021

(65) Prior Publication Data

US 2022/0044018 A1 Feb. 10, 2022

Related U.S. Application Data

(60) Provisional application No. 63/063,139, filed on Aug. 7, 2020.

(51) Int. Cl.
| | |
|---|---|
| *G06V 20/20* | (2022.01) |
| *G06N 20/00* | (2019.01) |
| *G06T 7/70* | (2017.01) |
| *G02B 27/01* | (2006.01) |
| *G06T 19/00* | (2011.01) |

(52) U.S. Cl.
CPC ............ *G06V 20/20* (2022.01); *G02B 27/017* (2013.01); *G06N 20/00* (2019.01); *G06T 7/70* (2017.01); *G06T 19/006* (2013.01); *G06T 2207/10028* (2013.01)

(58) Field of Classification Search
CPC ...... G06V 20/20; G02B 27/017; G06N 20/00; G06T 7/70; G06T 19/006; G06T 2207/10028
See application file for complete search history.

(56) References Cited

U.S. PATENT DOCUMENTS

| | | | |
|---|---|---|---|
| 9,635,285 B2 | 4/2017 | Teich | |
| 2016/0054452 A1* | 2/2016 | Cosatto | G01S 19/48 |
| | | | 701/412 |
| 2016/0171669 A1* | 6/2016 | Abdollahian | G06T 7/50 |
| | | | 382/254 |
| 2017/0046877 A1* | 2/2017 | Hustad | G09G 5/003 |
| 2018/0012078 A1* | 1/2018 | Pournaghi | G06K 9/00718 |
| 2020/0242848 A1* | 7/2020 | Ambler | G01S 15/8993 |

* cited by examiner

*Primary Examiner* — Jitesh Patel
(74) *Attorney, Agent, or Firm* — BakerHostetler

(57) ABSTRACT

Implementations of the subject technology provide visualizations of non-visible features of a physical environment, at the location of the non-visible features in the physical environment. The non-visible features may include wireless communications signals, sounds, airflow, gases, subsonic and/or ultrasonic waves, hidden objects, or the like. A device may store visual contexts for visualizations of particular non-visible features. The device may obtain a depth map that allows the device to determine the location of the non-visible feature in the physical environment and to overlay the visualization on a user's view of that location. In this way, the non-visible feature can be visualized its correct location, orientation, direction and/or strength in the physical environment.

23 Claims, 7 Drawing Sheets

VISUALIZATION OF NON-VISIBLE PHENOMENA

CROSS REFERENCE TO RELATED APPLICATIONS

This application claims the benefit of priority to U.S. Provisional Patent Application No. 63/063,139, filed on Aug. 7, 2020, the disclosure of which is hereby incorporated herein in its entirety.

TECHNICAL FIELD

The present description relates generally to extended reality environments.

BACKGROUND

Extended reality technology aims to bridge a gap between virtual environments and a physical environment by providing an enhanced physical environment that is augmented with computer-generated content that is not part of the physical environment. As a result, the computer-generated content that is not part of the physical environment appears to be part of the physical environment as perceived by a user.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
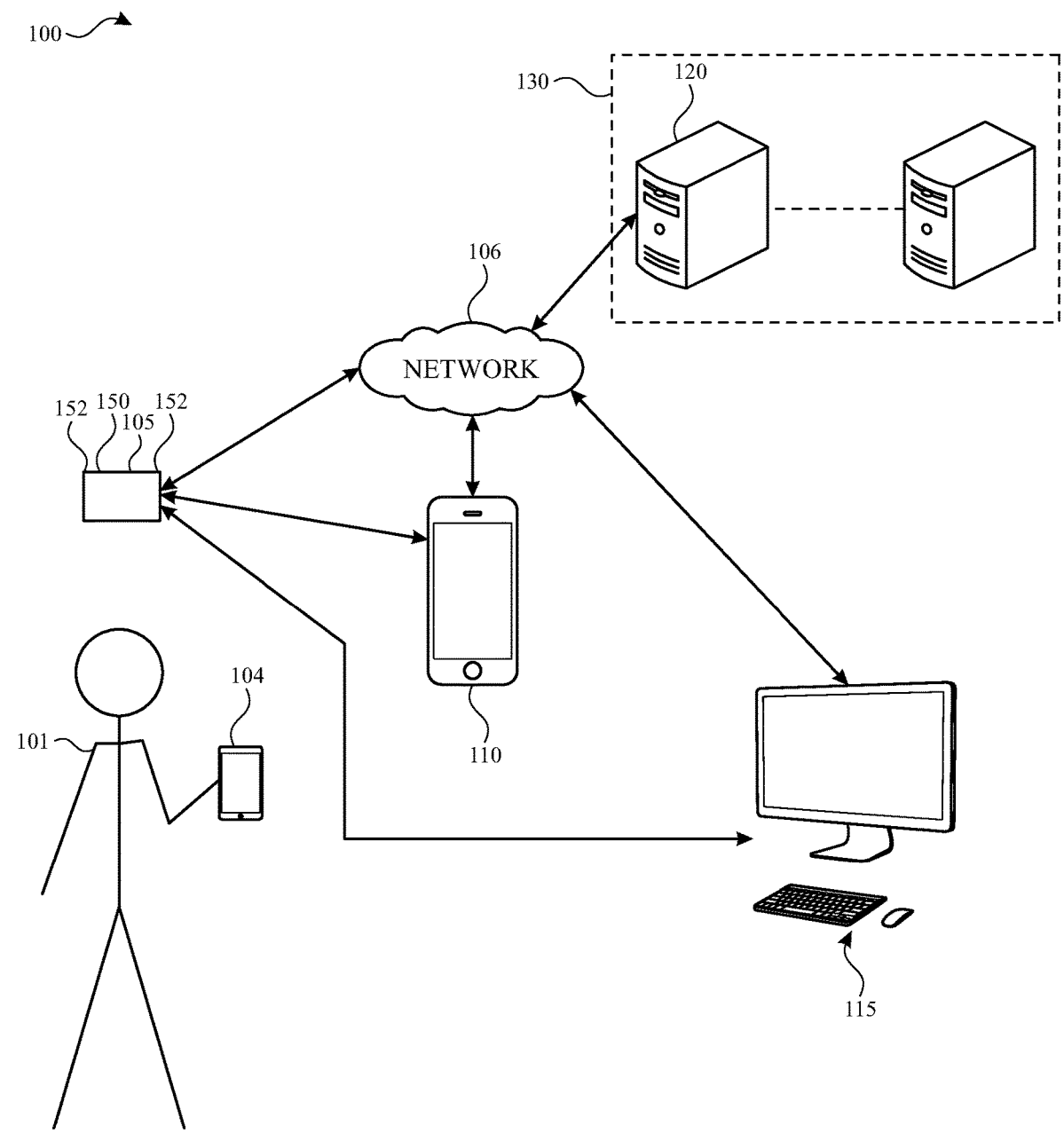
FIG. 1 illustrates an example system architecture including various electronic devices that may implement the subject system.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide an XR system that displays a virtual representation of non-visible features of a physical environment, such that a user of the XR system perceives the non-visible features at the location of the non-visible features in the physical environment. For example, a device may detect, and/or receive information regarding, one or more non-visible features within a direct or pass-through field of view of a physical environment, and display a visualization of those detected non-visible features at the correct location of those features in the physical environment.

For example, responsive to a detection of non-visible feature of a physical environment, the device may display a visualization of the non-visible feature overlaid on the view of the physical environment at a location that that corresponds to the detected non-visible features. The non-visible features may correspond to, for example, electromagnetic signals such as Wi-Fi signals, airflow from an HVAC system, temperatures of physical objects, fluids or gasses, an audible fence created for a pet (e.g., using ultrasonic pitches), sounds generated by a musical instrument, and/or hidden physical objects such as objects with known locations that are obscured from view by other physical objects (as examples).

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, and a server 120. For explanatory purposes, the system architecture 100 is illustrated in FIG. 1 as including the electronic device 105, the handheld electronic device 104, the electronic device 110, the electronic device 115, and the server 120; however, the system architecture 100 may include any number of electronic devices and any number of servers or a data center including multiple servers.

The electronic device 105 may be smartphone, a tablet, or a wearable device such as a head mounted portable system (e.g., a head mounted display device) that can be worn by a user such as user 101, that includes a display system capable of presenting an extended reality environment including one or more visualizations of non-visible features of physical environment to the user. The electronic device 105 may be powered with a battery and/or another power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, mobile device, and the like.

The electronic device 105 may include one or more cameras such as camera 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors (e.g., including a wireless communications antenna configured to send and/or receive Wi-Fi signals), gas sensors, airflow sensors, near-field communications sensors and/or antennas, millimeter wave radar sensors, light intensity sensors, air quality sensors, humidity sensors, potential of hydrogen (PH) sensors, moisture sensors, flame sensors, steam detection sensors, etc. Lidar sensors, radar sensors, sonar sensors, time-of-flight sensors and the like may be included and/or combined in sensors 152 to form depth sensors. Depth sensors of sensors 152 can be used to obtain depth information for a physical environment of electronic device 105, which can be used to generate one or more depth maps of some or all of the physical environment. Moreover, the electronic device 105 may include hardware elements that can receive user input such as hardware buttons or switches.

User input detected by such sensors and/or hardware elements correspond to various input modalities for initiating display of visualizations of one or more non-visible phenomena in the physical environment. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect (e.g., using camera 150 and/or sensors 152) a presence of a person or object and/or one or more non-visible features of a physical environment that would not be visible to a user of the electronic device 105 without the use of the head mounted system.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the generated extended reality environment in a real-time manner.

The network 106 may communicatively (directly or indirectly) couple, for example, the electronic device 105, the electronic device 110 and/or the electronic device 115 with the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic device discussed below with respect to the electronic system discussed below with respect to FIG. 7. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 7.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, building schematics or schematics for other structures, audio and multi-media files, and the like for extended reality environments. In an implementation, the server 120 may function as a cloud storage server that stores any of the aforementioned extended reality content generated by the above-discussed devices and/or the server 120.

Figure 2:
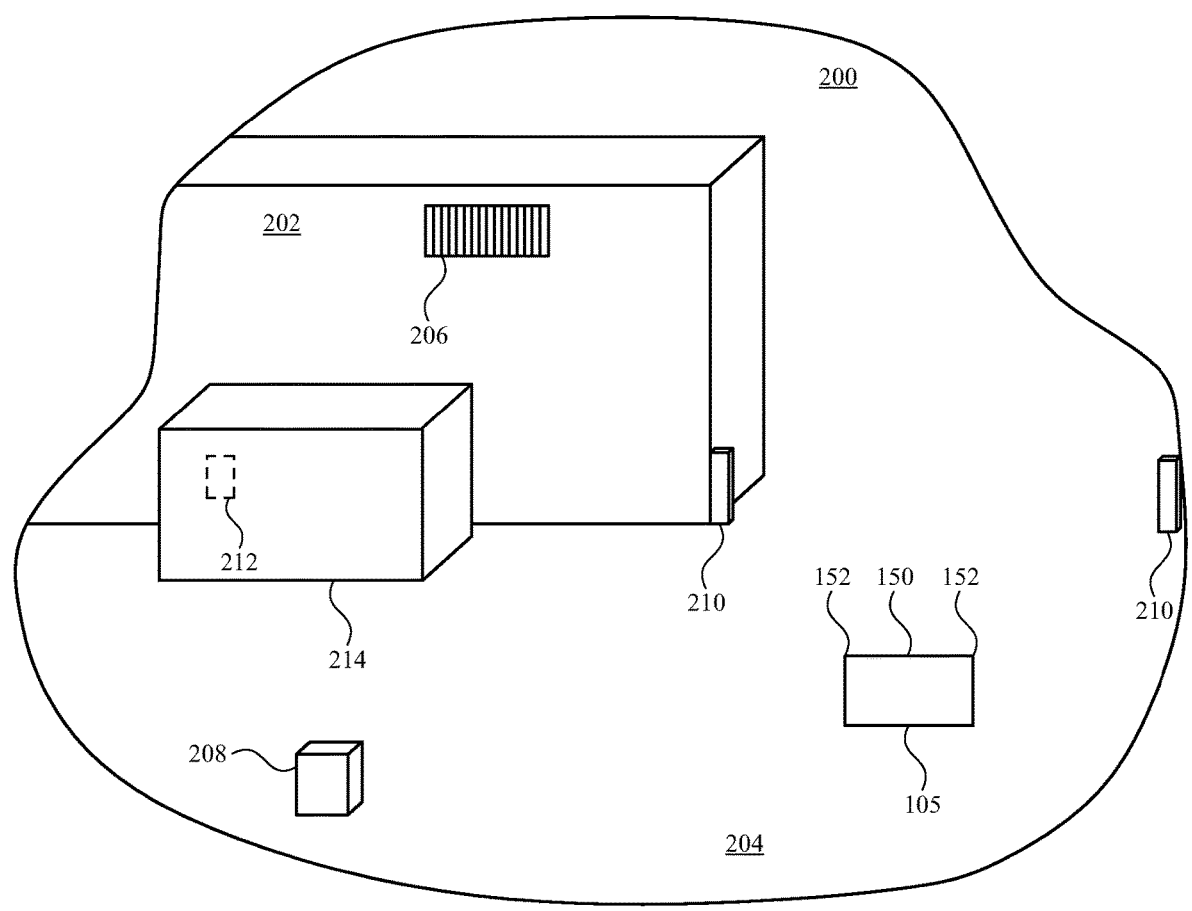
FIG. 2 illustrates an example of a physical environment of an electronic device, the physical environment including visible and non-visible features in accordance with one or more implementations.

FIG. 2 illustrates an example physical environment that includes various visible and non-visible features and/or phenomena. Visible features of a physical environment may be features that emit, reflect, absorb, and/or include light in the visible light spectrum that is visible to the human eye (e.g., light having wavelengths between approximately 400 nanometers (nm) and 700 nm). In the example of FIG. 2, a physical environment 200 of electronic device 105 includes visible features such as a wall 202, a floor 204, a vent 206, a wireless router 208, furniture 214, and ultrasonic fencing devices 210. A light bulb in the physical environment, and visible light emitted by the light bulb when the light bulb is powered, may also be visible features of the visible environment.

The physical environment 200 may also include non-visible features that would not be visible to a person in the room without the aid of electronic equipment such as electronic device 105. Non-visible features of a physical environment may be features that exist outside the visible light spectrum, such as features that do not emit, reflect, absorb, and/or include light in the visible light spectrum. Non-visible features may emit, reflect, absorb, and/or include light outside the visible spectrum (e.g., light having wavelengths less than about 400 nm and/or greater than about 700 nm, such as microwaves, radio waves, or ultraviolet (UV) light). Non-visible features of a physical environment may also be features that are unrelated to light, such as sounds, ultrasonic or subsonic waves in a gas such as air, movement of gases such as air, and/or other non-light features. For example, wireless router 208 (e.g., a visible feature of the physical environment) may emit a Wi-Fi signal (e.g., a non-visible feature of the physical environment) that is detectable by sensors 152 of electronic device 105 and that can be used to exchange communications with a local or wide area network, but that is not visible to the human eye. As another example, air such as air from a heating, ventilation, and air conditioning (HVAC) system may flow from vent 206. A person in the physical environment 200 may feel the airflow from vent 206, but may not be able to see the airflow. As another example, ultrasonic fencing devices 210 may emit and/or reflect ultrasonic waves in the air of the room that are not visible to the human eye or audible to the human ear, but that are audible to a dog, a cat, or other pet to create an invisible fence between the ultrasonic fencing devices. A UV light bulb may be visible feature of a physical environment that emits a non-visible feature of the physical environment (UV light).

As another example, features of the physical environment 200 that would otherwise be visible may be non-visible due to being hidden by other visible features. Features of the physical environment 200 that would otherwise be visible may be non-visible due to being hidden by other visible features may be first features that emit, reflect, absorb, and/or include light in the visible light spectrum, but for which one or more second features that that emit, reflect, absorb, obscure, and/or include light in the visible light spectrum are disposed between the first features and a user, thereby preventing a line of sight to the first features for the user. For example, an electrical outlet 212 may be non-visible due to furniture 214 that blocks the electrical outlet 212 from view. Electronic device 105 may determine the location of visually hidden objects such as electrical outlet 212 by detecting the visually hidden objects and/or based on known, learned, and/or stored locations of the visually hidden objects.

The visible and/or non-visible features of a physical environment, such as the physical environment 200 in the example of FIG. 2, can be detected, mapped, and/or categorized using images from one or more cameras such as camera 150 and/or sensor data from one or more sensors (e.g., depth sensors) such as sensors 152. Visible features of the physical environment may be detected, for example, using cameras and/or sensors that are capable of sensing light in the visible light spectrum. Non-visible features of the physical environment may be detected using cameras and/or sensors (e.g., microwave sensors, IR sensors, ultraviolet sensors, microphones, ultrasonic sensors, sub-sonic sensors, gas sensors, flow sensors, etc.) that are capable of sensing features that exist outside the visible light spectrum. In one or more implementations, electronic device 105 may identify a location of each detected non-visible feature and a visual context for each detected non-visible feature in the physical environment 200. The location of a non-visible feature may be a three-dimensional location and/or range of locations determined, in part, based on a depth map of the physical environment. The depth map of the physical environment may be obtained and/or generated by the electronic device 105.

The visual context for a non-visible feature may be determined based on a type of sensor used to detect the non-visible feature, based on an identified type of the non-visible feature, based on an identified object associated with the non-visible feature (e.g., a visible source of the non-visible feature), and/or based on other aspects of the non-visible feature. The visual context for a non-visible feature can be adjusted, based on sensor data associated with the non-visible feature, to generate a visualization of the non-visible feature. For example, the visual context for a Wi-Fi signal may be a three-dimensional map or cloud having a color and/or a density that is adjustable to correspond to the strength of the Wi-Fi signal at a particular three-dimensional location. The visual context for a sound from a musical instrument may include one or more sine waves with a frequency that is adjustable based on the frequency of the sound. The visualization of a non-visible feature may be a sensor-adjusted visual context for that non-visible feature.

Figure 3:
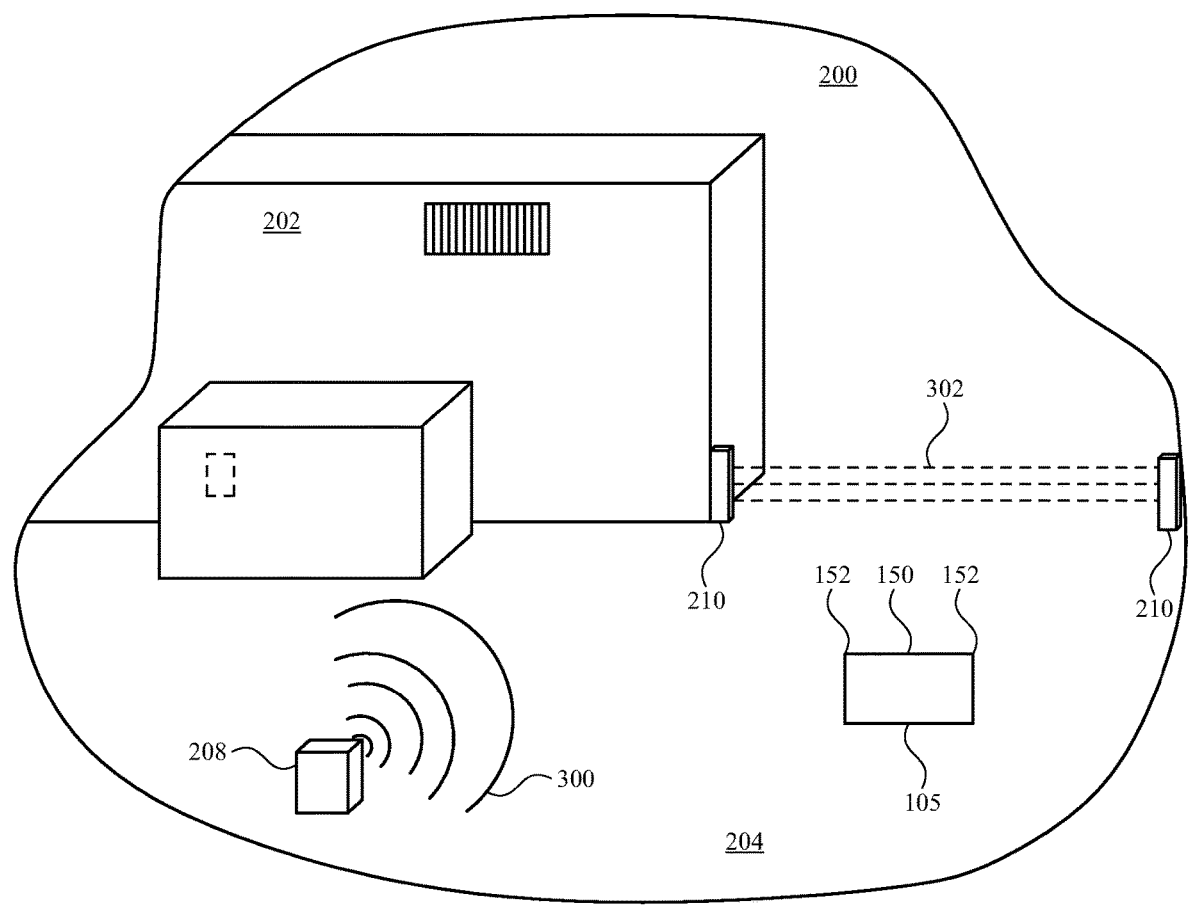
FIG. 3 illustrates an example extended reality (XR) environment that includes the physical environment of FIG. 2 and computer-generated visualizations of some of the non-visible phenomena of the physical environment in accordance with one or more implementations.
Figure 4:
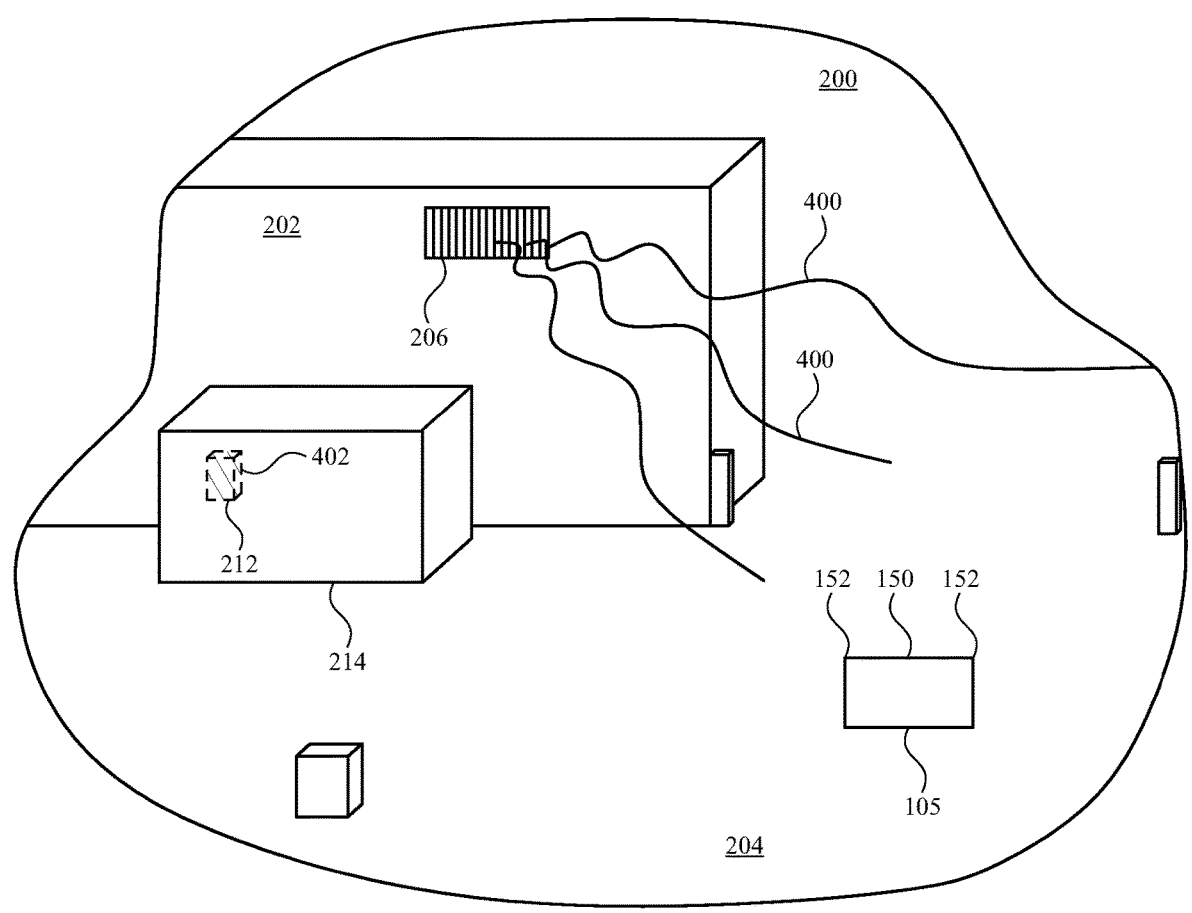
FIG. 4 illustrates an example XR environment that includes the physical environment of FIG. 2 and computer-generated visualizations of other non-visible phenomena of the physical environment in accordance with one or more implementations.
Figure 5:
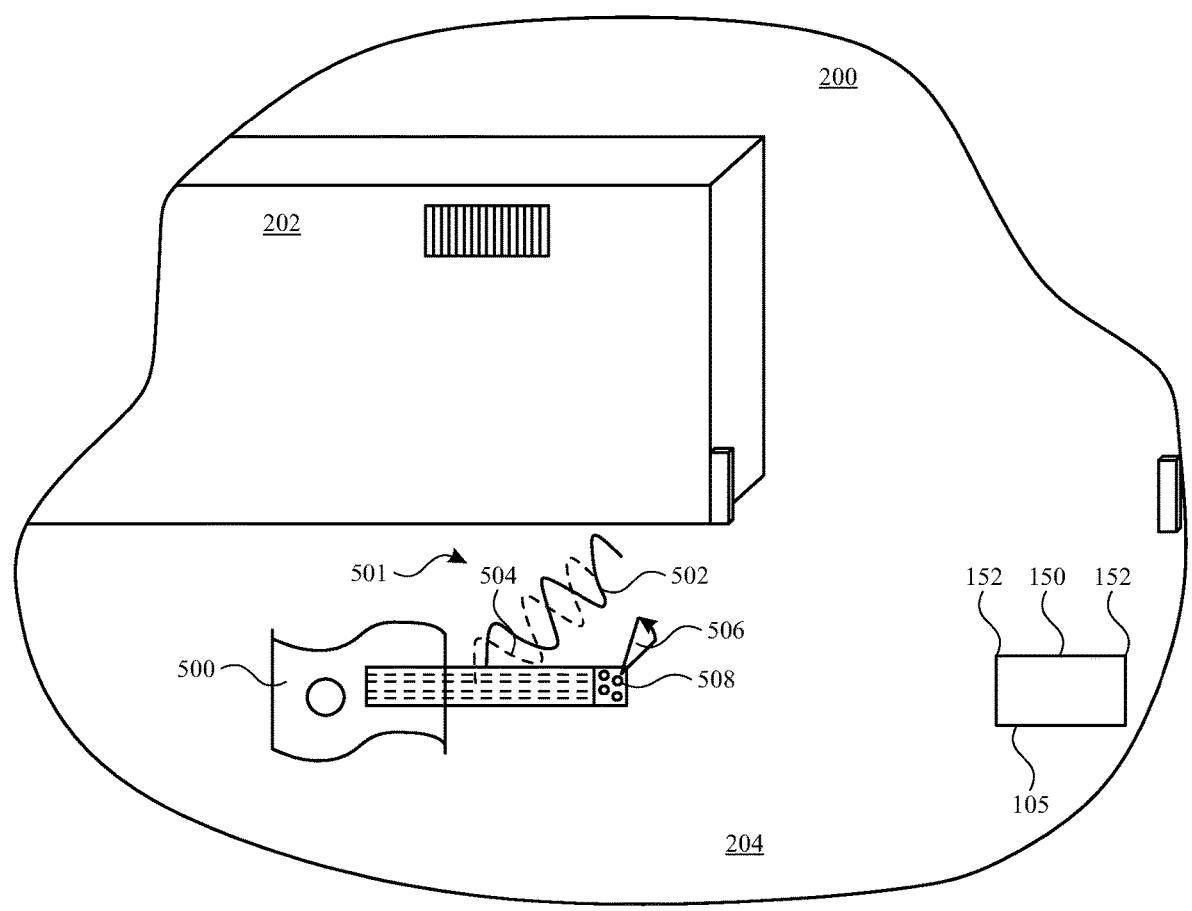
FIG. 5 illustrates another example XR environment that includes a physical object and computer-generated visualizations of non-visible phenomena associated with the physical object in accordance with one or more implementations.

FIGS. 3, 4, and 5 illustrates various examples of visualizations of non-visible features of a physical environment that can be provided by a device such as an electronic device 105.

In the example of FIG. 3, a visualization 300 of the non-visible Wi-Fi signal from wireless router 208 is displayed so as to appear to be emanating from the wireless router and decreasing in strength with increased distance from the wireless router. The Wi-Fi signal of FIG. 3 includes light outside of the visible light spectrum that is thus non-visible to a human observer without the aid of the visualization 300, which represents the Wi-Fi signal in the visible light spectrum using visible light generated by, for example, a display of electronic device 105. In the example of FIG. 3, the visualization 300 of Wi-Fi signal strength is based on a visual context that includes a series of curved lines that are separated by an increasing distance with decreasing signal strength. The separation of the curved lines may be an adjustable feature of the visual context, adjustable based on the signal strength as determined by a sensor of the device. However, the particular implementation of the visualization of FIG. 3 is merely illustrative. The lines of the visualization 300 in FIG. 3 may be representative of a visual context that includes three-dimensional curved shells that are separated by an increasing distance with decreasing signal strength, or the visualization 300 can be based on a visual context that is more smoothly continuous such as a color-coded or monochrome cloud with a color and/or density that changes and/or decreases with decreasing signal strength The strength of the Wi-Fi signal at various three-dimensional locations may be determined based on multiple measurements of the Wi-Fi signal strength at multiple locations using electronic device 105 and/or other devices, based on Wi-Fi signal information provided to electronic device 105 from the wireless router 208, and/or based on a detection of the location of the wireless router and a known or learned signal diffusion pattern for that wireless router or a generic wireless router (e.g., in a generic environment or in the physical environment 200 as mapped using a depth map obtained and/or generated by the electronic device 105). For example, the electronic device 105 may identify objects in the physical environment 200 that may interfere with the propagation of the Wi-Fi signals. In one or more implementations, the electronic device 105 may receive information from the wireless router (or from another device) that indicates one or more attributes or properties of one or more Wi-Fi signals being transmitted by the Wi-Fi router, such as signal strength, directionality, frequency, and the like.

A device such as electronic device 105 can determine the location at which to display the visualization 300 (e.g., by generating visible light in the visible light spectrum using the display of the device) using the sensor data that indicates the Wi-Fi strength and a depth map of the physical environment, adjust a portion of the visual context corresponding to the Wi-Fi signals based on the sensor data, and display the visualization 300 by displaying the visual context, with the portion adjusted based on the sensor data, at the determined location (e.g., by displaying the visualization 300 with a portion of a display of the device that is aligned with the users direct or pass-through view of the location in the physical environment).

In the example of FIG. 3, a visualization 302 of a non-visible ultrasonic fence generated by ultrasonic fencing device 210 is also displayed, to be perceived by a user of electronic device 105 at the three-dimensional location of the non-visible ultrasonic fence. In the example of FIG. 3, the visualization 302 is a representation, in the visible light spectrum, of the ultrasonic fence that exists outside the visible light spectrum. In this example, the visualization 302 is based on a visual context for ultrasonic waves that includes a set of lines corresponding to the path of the ultrasonic waves and having a spacing and/or a variation (e.g., a wave frequency) that is adjustable based on the strength and/or frequency of the detected ultrasonic waves. In order to display a visualization such as visualization 302, the electronic device 105 may, for example, detect the ultrasonic waves (e.g., using at least one microphone of the device), identify a strength and/or a frequency of the detected ultrasonic waves at one or more locations in the physical environment (e.g., using at least another microphone of the device, using a depth map of the physical environment, and/or using information provided from the ultrasonic fencing devices 210), identify a visual context for the ultrasonic waves (e.g., the set lines having an adjustable spacing and/or variation), adjust the adjustable features of the visual context based on the identified strength and/or frequency, and display the adjusted visual context to appear at the identified locations. In one or more implementations, the electronic device 105 may receive information regarding the ultrasonic waves, such as signal strength, directionality, frequency, etc., from the emitting the ultrasonic waves.

FIG. 4 illustrates other visualizations of non-visible phenomena that can be provided by a device such as electronic device 105. In the example of FIG. 4, a visualization 400 of airflow from vent 206 is illustrated. In this example, the visualization 400 is a representation, in the visible light spectrum, of the airflow existing outside the visible light spectrum. In this example, the visualization 400 is based on a visual context that includes a wavy lines with a wave frequency and a separation that increases with decreasing airflow. However, the visualization 400 in the example of FIG. 4 is merely illustrative and other visual contexts can be used to generate the visualization (e.g., a vector map of the airflow or a depiction of a flowing cloud moving with the direction and speed of the airflow). The airflow may be detected using an airflow sensor of electronic device 105 that detects airflow directly from the movement of air through the sensor and/or indirectly (e.g., based on a detection of the sound of the airflow using one or more microphones, a detection of vent 206, and an extrapolation of the airflow based on a known and/or learned airflow diffusion pattern for a generic environment and/or the actual physical environment 200. For example, using a depth map of the physical environment, the device can determine an airflow pattern that flows over and/or around physical objects in the environment. In one or more implementations. the depth map, the location of the vent, and one or more audio signals can be provided to a machine learning engine that has been trained to output a three-dimensional map of air speed and direction that can be used to adjust the visual context for airflow to generate the visualization 400.

FIG. 4 also illustrates how non-visible features such as hidden features of a physical environment (e.g., features that emit, reflect, and/or absorb light in the visible light spectrum, but for which a line of sight to the feature is not available) can be visualized using a device such as electronic device 105. In the example of FIG. 4, a visualization 402 of electrical outlet 212 that is hidden from view by furniture 214 appears at the location of the electrical outlet 212. A device such as electronic device 105 may detect the electrical outlet 212 and/or the location of the electrical outlet 212 based on electromagnetic radiation (e.g., radiation outside the visible light spectrum) from the electrical outlet and/or wires leading to and/or from the electrical outlet (e.g., using electromagnetic sensors at the device), based on a previously stored identification of the electrical outlet 212 at a time or from a position at which the electrical outlet was visible to the camera 150 of the device, and/or from a known schematic of the physical environment combined with a depth map of the physical environment. In this way, a device such as electronic device 105 can be used to visualize the locations of hidden features of the physical environment such as a hidden electrical outlet, switch or other component, a hidden emergency exit (e.g., hidden behind wall 202), and/or learned, stored, and/or sensed features of a previously mapped physical environment that are hidden by smoke or other temporary obscuring phenomena.

As shown in the example of FIG. 5, visualizations of non-visible phenomena can also be used to guide a user of a device, such as a wearer of electronic device 105, in adjusting the physical environment. In the example of FIG. 5, a musical instrument implemented as a guitar 500 is shown being tuned using a visualization 501 of the non-visible sound generated by a string of the guitar. In this example, the visualization 501 is a representation, in the visible light spectrum, of the sound existing outside the visible light spectrum. In this example, the visualization is generated based on a visual context that includes two sine waves such as a first sine wave 502 and a second sine wave 504.

The first sine wave 502 may be displayed with a frequency that corresponds to a desired frequency for the guitar string (e.g., as determined based on a user input and/or by detecting the guitar and/or the string of the guitar using camera 150 and/or sensors 152 and using known/stored/learned features of guitar tuning parameters). For example, the electronic device 105 may detect which string on the guitar is being tuned and may determine the appropriate string pitch for the detected string (e.g., E, A, D, B, G, etc.). The second sine wave 504 may have a frequency that is adjusted based on the detected frequency of the sound generated by the string (e.g., as determined using a microphone of the sensors 152). As the tension on the string of the guitar is adjusted, thereby changing the frequency of the sound generated by the string and detected by the device, the frequency of the second sine wave 504 can be changed to be closer to, or further from, the desired frequency indicated by the first sine wave 502.

As shown, the visualization 501 is displayed, using the detected location of the guitar and/or the string, such that both the first sine wave 502 and the second sine wave 504 appear to be emanating from location (e.g., the three-dimensional location) of the guitar 500 in the physical environment 200. FIG. 5 also shows how a virtual adjustment indicator, such as adjustment indicator 506, can also be displayed (e.g., by electronic device 105) to appear at a location in the physical environment 200. For example, a device such as electronic device 105 may detect a physical feature of an object, such as a tuning knob 508 of guitar 500 (e.g., by providing image data from camera 150 and/or depth sensor data from a depth sensor of the device to a machine learning model that has been trained to recognize various physical features of various objects). The device may display an adjustment indicator, such as adjustment indicator 506, at a location associated with the physical feature of the object.

For example, in FIG. 5, adjustment indicator 506 is a curved arrow, displayed to appear at the location of the tuning knob 508 that is coupled to the string of the guitar that is generating the sound. The curved arrow can be adjusted based on the detected frequency of the sound of the guitar string and a detected coupling to the tuning knob 508, to point in a direction in which the tuning knob 508 can be turned to adjust the frequency of the string of the guitar to match the desired frequency. The curved arrow may be generated with a size, a thickness, a color, and/or one or more other visual features that indicate an amount of the adjustment that is needed to adjust the frequency of the string of the guitar to match the desired frequency. Although an adjustment indicator for guitar tuning is shown in FIG. 5, adjustment indicators can also be provided for other non-visible phenomena such as an adjustment indicator at the location of a thermostat that indicates an adjustment of the thermostat to adjust a temperature in the physical environment (e.g., a temperature that is being visualized by a heat map visualization provided by the device).

It should be appreciated that, in contrast with, for example, a conventional heat image from an infrared camera or a frequency indicator from an electronic guitar tuner, the visualizations in the examples of FIGS. 3, 4, and 5 are displayed by a device such as electronic device 105 having the depth mapping capabilities that allow the displayed visualizations to appear at the actual three-dimensional location in the physical environment at which those non-visible features actually exist. In the examples of FIGS. 3, 4, and 5, motion tracking of electronic device 105 (e.g., by the sensors 152 of electronic device 105 itself) can be used to maintain the display of the visualizations at the locations of the corresponding non-visible phenomena, even as the user looks around and/or moves around the physical environment and changes the orientation and/or location of the device.

It should also be appreciated that the examples of FIGS. 3, 4, and 5 are merely illustrative and a device such as electronic device 105 can provide visualizations of other non-visible phenomena in a physical environment. In one example, a visualization of sound volume or a type of sound can be displayed (e.g., using a visual context such as a sound density map or other visual context for sound that can be adjusted based on microphone data). For example, the visualization of the sound can indicate various songs or types of music playing in various locations (e.g., in different rooms of a building) and/or the volume of the music playing in the various locations. In another example, a visualization of a location of a friend or contact in a crowd can be provided (e.g., based on a detection of a signal from a device of the friend or contact, at a time when the friend or contact is not visible to the user/wearer of the device). In another example, a visualization of wind in the environment of the user, or a visualization of the Sun at the location of the Sun behind clouds on a cloudy day can be provided.

In other examples, one or more sensors of an electronic device can detect non-visible features of a physical environment that have been added to the physical environment specifically for detection and/or visualization with the electronic device. In one example, billboards, posters, or other print or screen media in the physical environment may emit non-visible light such as IR light that can be detected and visualized with an electronic device such as electronic device 105. For example, advertisements for upcoming attractions at a movie theatre may include enhanced visual features generated in IR light that are only visible to users of an AR, VR, or MR device that provides a visualization of the IR light. These enhanced visual features may include three-dimensional features that appear among the physical objects of the physical environment. In one or more implementations, a user of an electronic device may be provided with the ability to interact with the visual features. In one or more implementations, the detected non-visible light can trigger other feedback from the electronic device such as audio, tactile, or other feedback corresponding to the enhanced visual features.

In another example, non-visible light such as infrared light may be generated at one or more locations to provide coded information to an electronic device such as electronic device 105. For example, in order to avoid providing unattractive or distracting quick response (QR) codes at physical locations and/or on physical objects in a physical environment, coded information (e.g., for providing a link to information or functionality for the device) can be encoded in non-visible light that is visible to a sensor of an electronic device such as electronic device 105. An electronic device such as electronic device 105 may generate a visualization of the non-visible codes to allow a user of the electronic device to interact with (e.g., scan or select) the code for further action by the device based on the non-visible code.

In another example, non-visible light and/or other sensors may detect non-visible beacons in the physical environment (e.g., infrared beacons or ultrasonic beacons). For example, non-visible beacons for detection by an electronic device such as electronic device 105 can be provided in the physical environment to provide markers with which the electronic device can build AR and/or MR graphics. For example, the non-visible beacons can be detected by the electronic device and visualized by the electronic device to indicate a path outdoors, and/or to provide another boundary, shape, direction, or the like that can be visualized by the electronic device and/or used to locate additional virtual content generated by the electronic device. Ultrasonic beacons may be provided, for example, in physical environments in which visible or non-visible beacons may be less effective, such as due to lack of or too much light (e.g., sunlight).

In another example, non-visible features can be added to the physical environment to provide scent experiences for users of an electronic device such as electronic device 105. For example, an electronic device such as electronic device 105 may be provided with an artificial scent device (a device configured to release one or a combination of gases, vapors, or particulates that mimic one or more predefined scents). The non-visible features added to the physical environment to trigger a scent experience may be detected by the electronic device, causing the artificial scent device to generate a corresponding scent. For example, a tea shop that links fruits and/or seasons to a scent may generate (e.g., using non-visible light and/or ultrasonic signals) non-visible depictions of fruit that can be visualized by a user of an electronic device, such as electronic device 105, that is passing by or within the tea shop. The detection of the non-visible depictions of fruit can also trigger generation of a scent corresponding to the depicted fruit, by the artificial scent device, in one or more implementations. An electronic device such as electronic device 105 may also include a scent sensor (e.g., including one or more gas sensors, particulate sensors, and/or processing circuitry configured to recognize scents based on the combination of detected gases and/or particulates). The tea shop that links fruits and/or seasons to a scent may generate the scent (e.g., using artificial or natural scents) in or around the tea shop, which can be detected by the electronic device. Responsive to detecting the scent, the electronic device may generate visualizations one or more objects corresponding to the scent (e.g., by generating a visualization of fruits and/or flowers responsive to detection of the scents of those fruits and/or flowers).

Figure 6:
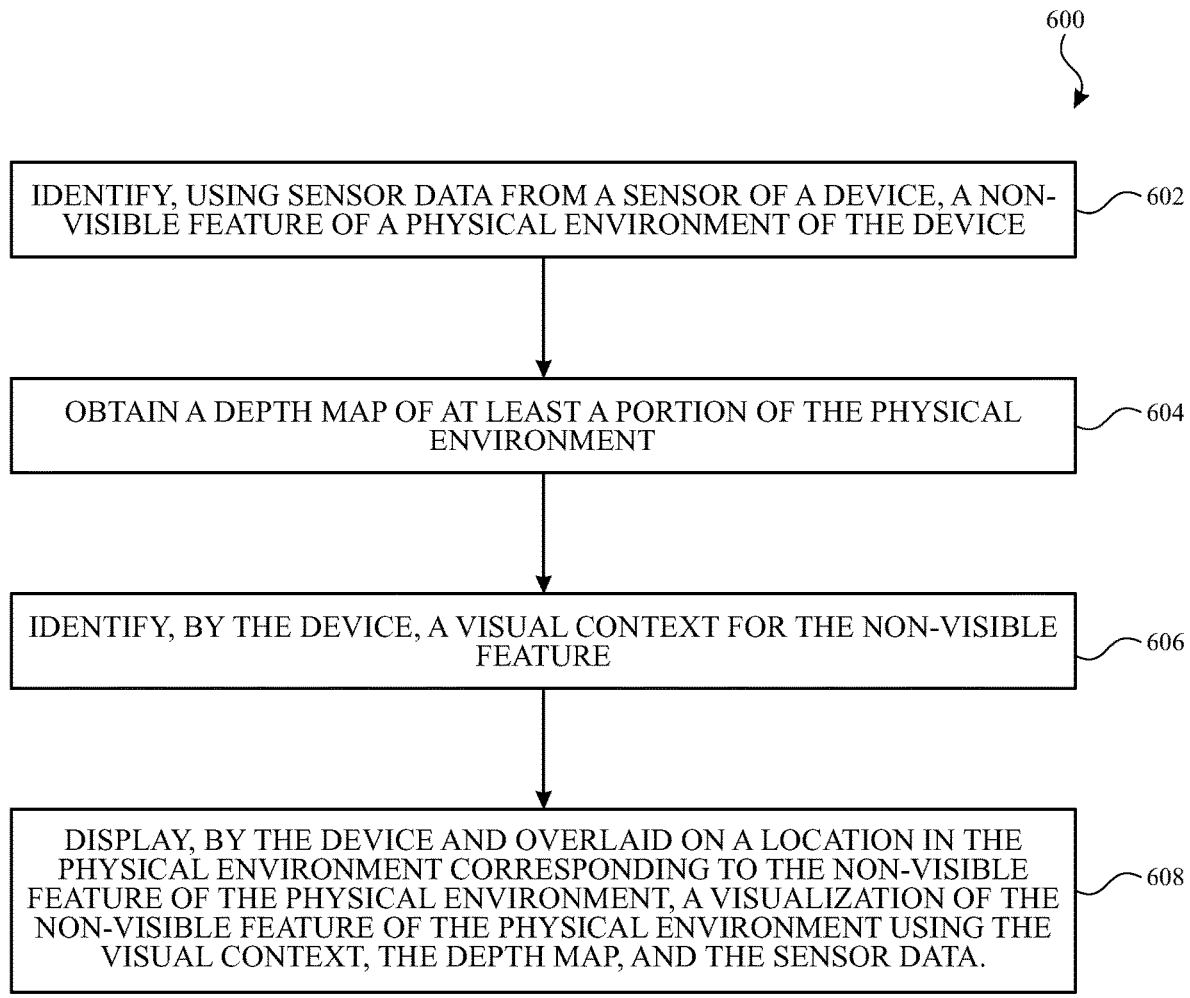
FIG. 6 illustrates a flow chart of an example process for providing computer-generated visualizations of non-visible phenomena in accordance with implementations of the subject technology.

FIG. 6 illustrates a flow diagram of an example process 600 for providing computer-generated visualizations of non-visible phenomena in accordance with implementations of the subject technology. For explanatory purposes, the process 600 is primarily described herein with reference to the electronic device 105 of FIG. 1. However, the process 600 is not limited to the electronic device 105 of FIG. 1, and one or more blocks (or operations) of the process 600 may be performed by one or more other components of other suitable devices, including the electronic device 105, the electronic device 110, the electronic device 115, and/or the servers 120. Further for explanatory purposes, some of the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

As illustrated in FIG. 6, at block 602, using sensor data from a sensor (e.g., one or more of sensors 152) of a device, a non-visible feature of a physical environment of the device may be identified. The non-visible feature may be hidden or may exist outside of the visible light spectrum. In one or more implementations, the device may be a head mounted device such as electronic device 105. The sensor data may include at least one of audio data, image data, wireless signal data, temperature data, airflow data, weather data, or gas sensor data (as examples). The non-visible feature of the physical environment may include, as examples, wireless communications signals (e.g., Wi-Fi signals, Bluetooth signals, etc.), subsonic or ultrasonic waves, airflow, sound, or hidden features (e.g., as described above in the examples of FIGS. 3, 4, and 5).

At block 604, the device may obtain a depth map of at least a portion of the physical environment. Obtaining the depth map may include generating the depth map using additional sensor data from an additional sensor, and/or using the same sensor. The additional sensor may be an additional sensor of the device (e.g., one or more sensors of sensors 152) or an additional sensor of an additional device in the physical environment (e.g., a companion device that is associated with the device such as a smartphone, a tablet, a laptop, a desktop, a peripheral camera, or a peripheral depth sensor or indicator associated with an account of the user of the device, or a device that is associated with another user). Obtaining the depth map may include generating the depth map in real time using one or more depth sensors of the device (e.g., depth sensors of sensors 152), and/or obtaining a previously generated depth map of some or all of the portion of the physical environment (e.g., a depth map previously generated by the device or another device).

At block 606, the device may identify a visual context for the non-visible feature. The visual context for the non-visible feature may be identified based on a type of the non-visible feature. Identifying the visual context may include identifying the visual context based on a type of the sensor data. Identifying the visual context may include identifying the visual context based on a type of an object at or near a location of the non-visible feature. For example, the device may identify the object and the type of the object (e.g., based on imaging data from camera(s) 150 and/or sensor data from one or more sensors 152). Visual contexts may include any of the visual contexts described above in connection with, for example, FIGS. 3, 4, and 5. The visual context may be identified by providing sensor data from one or more of sensor 152 to a machine learning engine that has been trained to identify non-visible features and/or visual contexts based on the input sensor data.

At block 608, the device may display, overlaid on a location in the physical environment corresponding to the non-visible feature of the physical environment, a visualization (see, e.g., visualizations 300, 302, 400, 402, and 501 of FIGS. 3, 4, and 5 as examples) of the non-visible feature of the physical environment using the visual context, the depth map, and the sensor data. The visualization may be a representation (e.g., generated by the display of the device) of the non-visible feature in the visible light spectrum. The location may be a three-dimensional location or a three-dimensional volume in the physical environment (e.g., a location identified as a source of the non-visible phenomena using one or more cameras and/or sensors of the device, including a depth sensor of the device and/or a volume within the non-visible feature is sensed and/or inferred to exist). In one or more implementations, the device may use the depth map to determine the location and/or volume in the physical environment for overlay of the visualization.

In an implementation in which the device identifies an object, the location may correspond to the location of the object and/or the location of a physical feature of the object. In one example, the device may identify a physical feature of the object (e.g., based on imaging data from camera(s) 150 and/or sensor data from one or more sensors 152). In one or more implementations, the device may also display an adjustment indicator (see, e.g., adjustment indicator 506 of FIG. 5) at a location associated with the physical feature of the object. In one or more implementations, the sensor data may be provided to a machine learning model, and the visualization may be generated based on an output of the machine learning model. For example, the machine learning model may have been trained to identify the non-visible phenomena, objects associated with the non-visible phenomena such as sources of the non-visible phenomena (e.g., a wireless router as a source of Wi-Fi signals, a vent as a source of airflow, etc.), and/or the visual context for the non-visible phenomena based on the sensor data.

For example, as described above in connection with FIG. 5 the object may be a musical instrument such as a guitar 500, the physical feature of the object may be a tuning knob 508 of the guitar, and the adjustment indicator 506 may include a virtual arrow that indicates the direction that the user should turn the tuning knob 508 to tune a corresponding string of the guitar. In this example, the virtual arrow can be displayed overlaid at or near the location of the tuning knob and can have a size, a color, or other visual feature to indicate how much further to turn the tuning knob to tune the string. For example, the virtual arrow can shrink or turn from red to green as the knob is turned in the correct direction for tuning, and/or the virtual arrow can grow or turn from green to red if the knob is turned in an incorrect direction for tuning.

In one or more implementations displaying the visualization may include displaying the visualization based on previously stored information for the physical environment. For example, the previously stored information may include a previously generated depth map of the physical environment (e.g., a depth map previously generated by the device and/or other device). As another example, the previously stored information may include a schematic diagram of the physical environment, such as an architectural schematic that indicates the locations of electrical components (e.g., electrical outlets, switches, or control panels) or other functional or structural features such as a thermostat or an emergency exit.

As described above, one aspect of the present technology is the gathering and use of data available from specific and legitimate sources for generating visualizations of non-visible features of a physical environment. The present disclosure contemplates that in some instances, this gathered data may include personal information data that uniquely identifies or can be used to identify a specific person. Such personal information data can include video data, three-dimensional geometry data, demographic data, location-based data, online identifiers, telephone numbers, email addresses, home addresses, biometric data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing computer-generated visualizations of non-visible phenomena.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing computer-generated visualizations of non-visible phenomena, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 7:
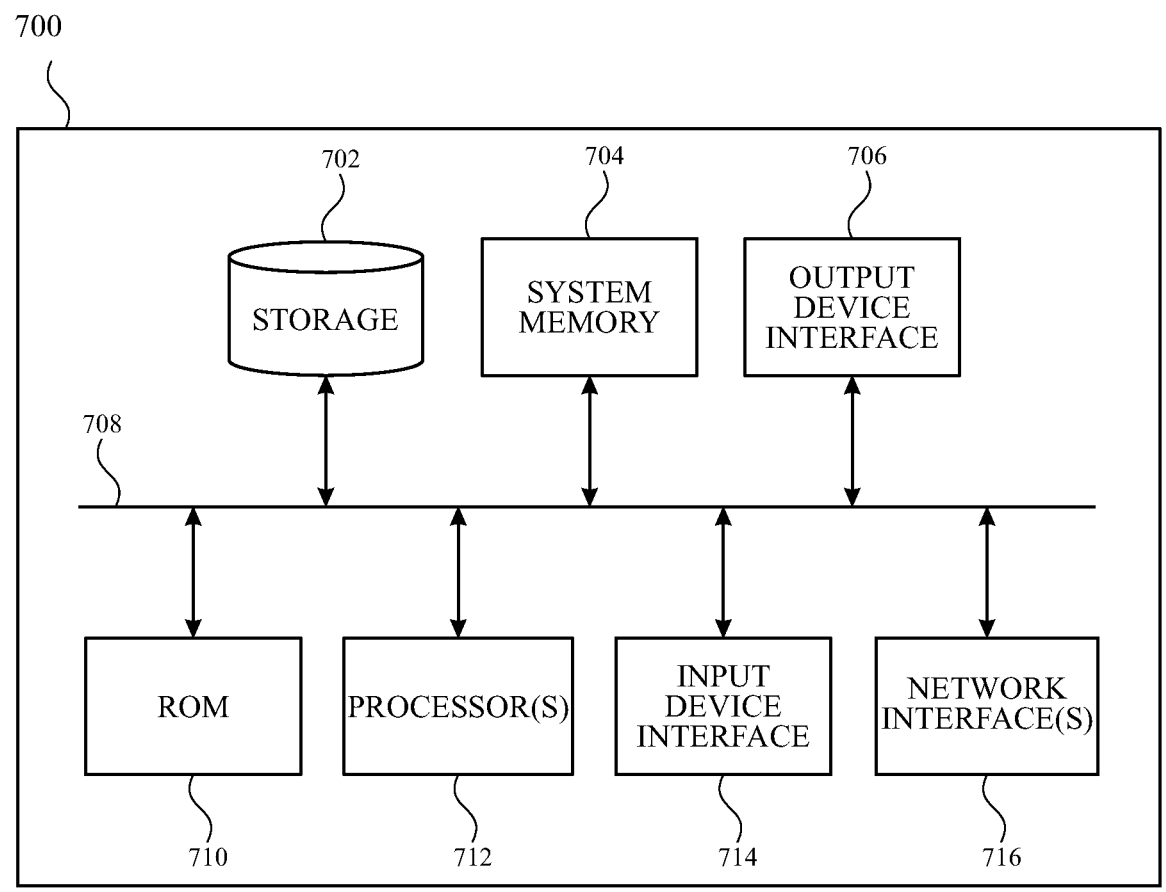
FIG. 7 illustrates an electronic system with which one or more implementations of the subject technology may be implemented.

FIG. 7 illustrates an electronic system 700 with which one or more implementations of the subject technology may be implemented. The electronic system 700 can be, and/or can be a part of, the electronic device 105, the handheld electronic device 104, the electronic device 110, the electronic device 115, and/or the server 120 as shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710 (which are each implemented as a non-transitory computer-readable medium). From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the electronic device 110 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

In accordance with aspects of the disclosure, a method is provided that includes identifying, using sensor data from a sensor of a device, a non-visible feature of a physical environment of the device; obtaining a depth map of at least a portion of the physical environment; identifying, by the device, a visual context for the non-visible feature; and displaying, by the device, a visualization of the non-visible feature of the physical environment using the visual context, the depth map, and the sensor data, the visualization being overlaid on a location in the physical environment corresponding to the non-visible feature of the physical environment.

In accordance with aspects of the disclosure, a device is provided that includes a sensor; one or more processors; and memory storing instructions that, when executed by the one or more processors causes the one or more processors to: identify, using sensor data from the sensor, a non-visible feature of a physical environment of the device; obtain a depth map of at least a portion of the physical environment; identify a visual context for the non-visible feature; and display a visualization of the non-visible feature of the physical environment using the visual context, the depth map, and the sensor data, the visualization being overlaid on a location in the physical environment corresponding to the non-visible feature of the physical environment.

In accordance with aspects of the disclosure, a non-transitory computer-readable medium is provided, the non-transitory computer-readable medium storing instructions that, when executed by one or more processors of a device, cause the one or more processors to: identify, using sensor data from a sensor of the device, a non-visible feature of a physical environment of the device; obtain a depth map of at least a portion of the physical environment; identify a visual context for the non-visible feature; and display a visualization of the non-visible feature of the physical environment using the visual context, the depth map, and the sensor data, the visualization being overlaid on a location in the physical environment corresponding to the non-visible feature of the physical environment.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a web site, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A method, comprising:
   identifying, using sensor data from a sensor of a device, a non-visible feature of a physical environment of the device;
   obtaining a depth map of at least a portion of the physical environment;
   identifying, by the device, a visual context for the non-visible feature; and
   displaying, by the device, a visualization of the non-visible feature of the physical environment using the visual context, the depth map, and the sensor data, the visualization being overlaid on a location in the physical environment corresponding to the non-visible feature of the physical environment.

2. The method of claim 1, wherein identifying the visual context comprises identifying the visual context based on a type of the sensor data.

3. The method of claim 1, wherein identifying the visual context comprises identifying the visual context based on a type of an object at the location.

4. The method of claim 3, further comprising identifying, by the device, the object and the type of the object.

5. The method of claim 4, further comprising:
   identifying, by the device, a physical feature of the object; and
   displaying an adjustment indicator at a location associated with the physical feature of the object.

6. The method of claim 1, wherein the location is a three-dimensional location in the physical environment, wherein the non-visible feature is hidden or exists outside of a visible light spectrum, and wherein the visualization comprises a representation of the non-visible feature in the visible light spectrum.

7. The method of claim 1, wherein the sensor data comprises at least one of audio data, image data, wireless signal data, temperature data, airflow data, weather data, or gas sensor data.

8. The method of claim 1, wherein obtaining the depth map comprises generating the depth map using additional sensor data from an additional sensor, and wherein the method further comprises using the depth map to determine the location in the physical environment for overlay of the visualization.

9. The method of claim 8, wherein the additional sensor comprises an additional sensor of the device.

10. The method of claim 8, wherein the additional sensor comprises an additional sensor of an additional device in the physical environment.

11. The method of claim 1, wherein displaying the visualization further comprises displaying the visualization based on previously stored information for the physical environment.

12. The method of claim 1, further comprising:
providing the sensor data to a machine learning model; and
generating the visualization based on an output of the machine learning model.

13. The method of claim 1, wherein the device comprises a head mounted device.

14. The method of claim 1, wherein the non-visible feature of the physical environment is a physical phenomenon in the physical environment that does not emit, reflect, or absorb light, in the visible light spectrum.

15. The method of claim 1, wherein the non-visible feature of the physical environment is a physical element in the physical environment that does not emit, reflect, or absorb light, in the visible light spectrum, that is received at the device.

16. The method of claim 1, wherein identifying the visual context for the non-visible feature comprises selecting the visual context from a plurality of visual contexts that are each stored at the device in connection with a respective non-visible feature type.

17. A device, comprising:
a sensor;
one or more processors; and
memory storing instructions that, when executed by the one or more processors, causes the one or more processors to:
identify, using sensor data from the sensor, a non-visible feature of a physical environment of the device;
obtain a depth map of at least a portion of the physical environment;
identify a visual context for the non-visible feature; and
display a visualization of the non-visible feature of the physical environment using the visual context, the depth map, and the sensor data, the visualization being overlaid on a location in the physical environment corresponding to the non-visible feature of the physical environment.

18. The device of claim 17, wherein the sensor comprises at least one of a microphone, a camera, a temperature sensor, a wireless communications antenna, a gas sensor, a depth sensor, a millimeter wave radar sensor, a light intensity sensor, an air quality sensor, a humidity sensor, a PH sensor, a moisture sensor, a flame sensor, or a steam detection sensor.

19. The device of claim 17, further comprising a depth sensor, wherein obtaining the depth map comprises generating the depth map using the depth sensor.

20. The device of claim 17, wherein the visual context comprises at least a portion that is adjustable based on the sensor data, and wherein the one or more processors are configured to display the visualization by:
determining the location using the sensor data and the depth map;
adjusting the portion of the visual context based on the sensor data; and
displaying the visual context, with the portion adjusted based on the sensor data, at the determined location.

21. A non-transitory computer-readable medium storing instructions that, when executed by one or more processors of a device, cause the one or more processors to:
identify, using sensor data from a sensor of the device, a non-visible feature of a physical environment of the device;
obtain a depth map of at least a portion of the physical environment;
identify a visual context for the non-visible feature; and
display a visualization of the non-visible feature of the physical environment using the visual context, the depth map, and the sensor data, the visualization being overlaid on a location in the physical environment corresponding to the non-visible feature of the physical environment.

22. The non-transitory computer-readable medium of claim 21, wherein the location is a three-dimensional location in the physical environment, wherein the non-visible feature is hidden or exists outside of a visible light spectrum, and wherein the visualization comprises a representation of the non-visible feature in the visible light spectrum.

23. The non-transitory computer-readable medium of claim 21, wherein the sensor data comprises at least one of audio data, image data, wireless signal data, temperature data, airflow data, weather data, or gas sensor data.

* * * * *